United States Patent [19]

Doty

[11] Patent Number: 4,903,377
[45] Date of Patent: Feb. 27, 1990

[54] FREE-FALLING, SELF-LOCKING ADJUSTABLE TIP ASSEMBLY

[75] Inventor: Gerald A. Doty, Crown Point, Ind.

[73] Assignee: Gateway Industries, Inc., Olympia Fields, Ill.

[21] Appl. No.: 200,684

[22] Filed: May 31, 1988

[51] Int. Cl.⁴ .............................................. A44B 11/06
[52] U.S. Cl. ........................................ 24/194; 24/171
[58] Field of Search ......................... 24/171, 194, 196; 297/468, 476; 280/801, 806, 808

[56] References Cited

U.S. PATENT DOCUMENTS

| | | | |
|---|---|---|---|
| 3,486,203 | 12/1969 | Cadiou | 24/196 |
| 3,928,895 | 12/1975 | Klink | 24/196 |
| 4,480,854 | 11/1984 | Doty | 297/476 X |

FOREIGN PATENT DOCUMENTS 3216075  11/1983  Fed. Rep. of Germany ........ 24/196

*Primary Examiner*—James R. Brittain
*Attorney, Agent, or Firm*—Fitch, Even, Tabin & Flannery

[57] ABSTRACT

An improved tip assembly including a tongue plate insertable into a buckle is provided for a safety belt system in which a continuous retractable belt length provides both a lap portion and a shoulder portion. The tip assembly through which the belt passes has a snubber slide engaged with the tongue plate and slidable relative thereto. When the belt is drawn across the occupant's body, the belt shifts the snubber slide rearwardly on the tongue plate to a point where the belt is firmly gripped between a surface of the tongue plate and a surface of the snubber slide, whereby that portion of the belt which extends across the occupant's lap cannot expand. When the belt is retracted so that a run of the belt is substantially vertical, the weight of the tip assembly causes its front end to tip downwardly causing the slide to fall vertically along the tongue plate releasing its grip on the belt, whereby the tip assembly freely falls to a lower position along the vertical belt position. A dampener is located in an engaging region of the tongue plate and snubber slide to effect quietness of action between these two parts.

5 Claims, 2 Drawing Sheets

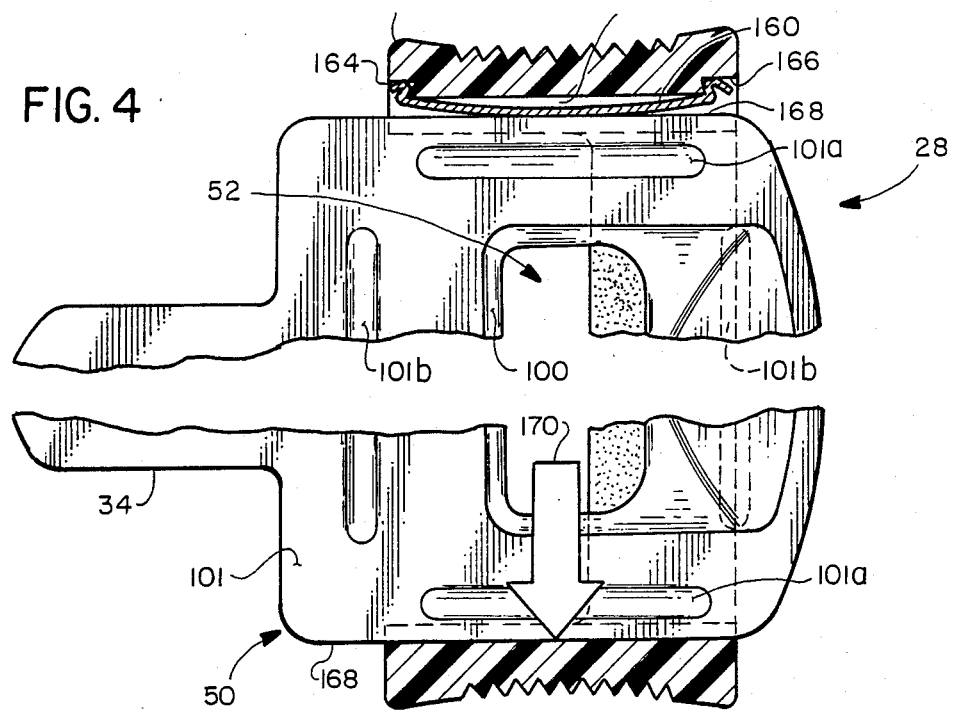
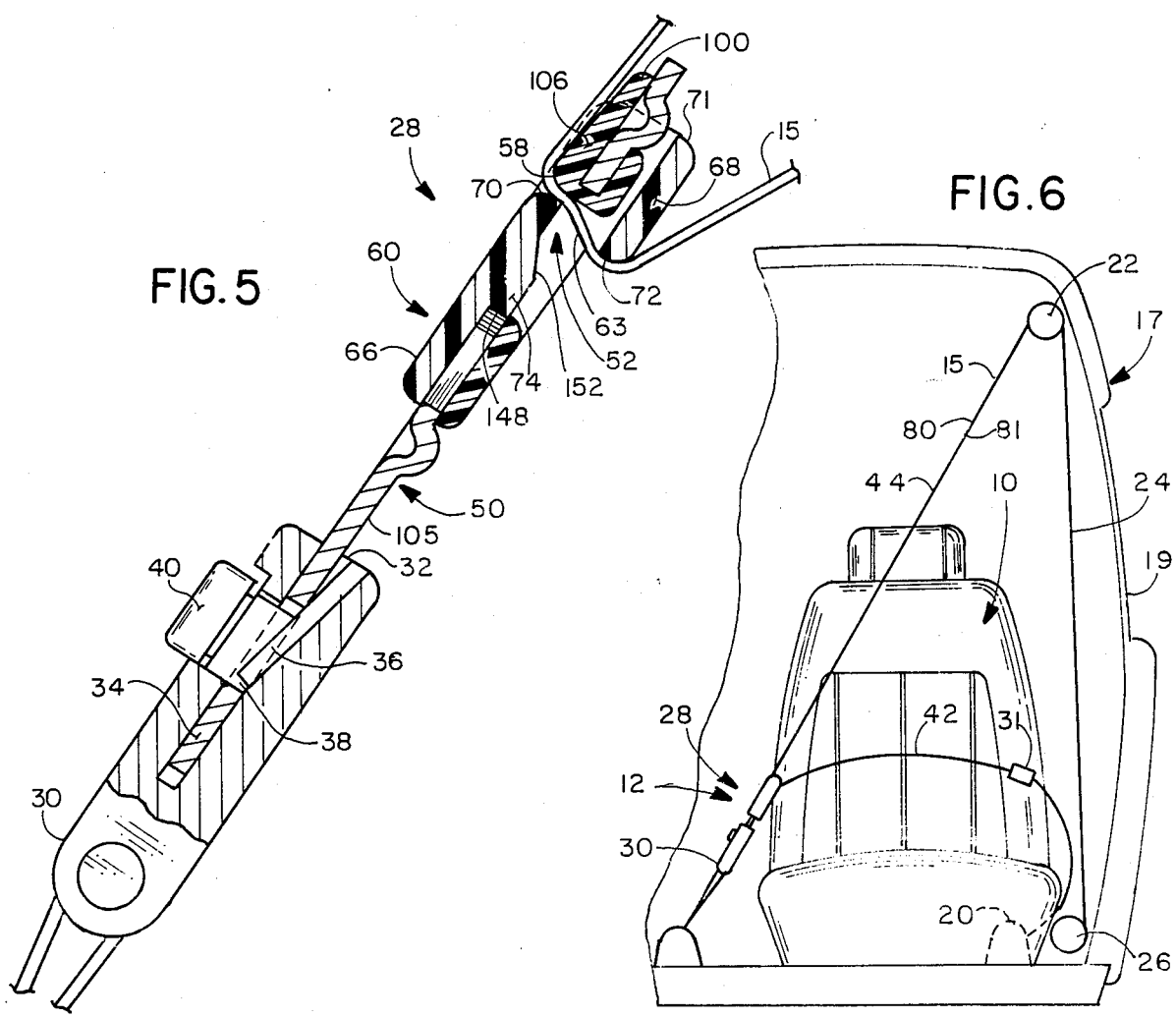

FREE-FALLING, SELF-LOCKING ADJUSTABLE TIP ASSEMBLY

This invention relates to a seat belt apparatus and to a slidable tip assembly on the seat belt which has a tongue or tip for releasable connection to a buckle and a slidable part to effect belt gripping.

This invention is described in connection with its preferred usage in which a seat belt retractor is connected to one end of the belt and is located adjacent a vehicle door, either on the floor or in the roof rail, to exert a tension or pulling force on its connected belt end. A tip assembly is carried on the belt and includes the tongue plate which the vehicle passenger grasps and inserts into locking engagement with a seat belt buckle. The buckle is usually located inboard of and along the seat where the occupant is to sit. The other end of the belt is usually connected to an anchor. In this buckled configuration, the span of the belt from the tip assembly to the anchor defines a lap belt portion extending over the lap of the seat occupant; while another portion of the belt extending upwardly from the tip assembly defines a shoulder-engaging portion extending across the chest and shoulder of the seat occupant to a hanger or the seat belt retractor located above the occupant's shoulder.

Background of the Invention

A tip assembly of the foregoing kind is shown and described in U.S. Pat. No. 4,480,854, issued Nov. 6, 1984 to the assignee of the present invention. This invention is an improvement of the free-falling, self-locking adjustable tip assembly shown and described in that patent. The tip assembly of that patent includes a tongue plate and a snubber slide engaged with the tongue plate and slidable relative to the tongue plate. A tendency exists, however, for the freely sliding snubber to cause a clatter or rattle when it is able to move freely with respect to the tongue plate. The sound thus caused might be undesirable in that a user might question the quality of the product. Although the problem is strictly one of sound and not of operation or operational quality, it is preferred to provide a tip assembly having the clatter or rattle between the parts substantially eliminated.

A detailed description of the seat belt apparatus and the slidable tip assembly on the seat belt is given in U.S. Pat. No. 4,480,854. To simplify this Application, only certain parts of that patent are included herein to describe the present invention, but the entire disclosure of U.S. Pat. No. 4,480,854 is incorporated herein by reference. Where practical, the reference numbers for like elements are retained herein to simplify any reading between the two documents.

SUMMARY OF THE INVENTION

It is a general object of the invention to provide a new and improved slidable tip assembly for seat belt apparatus wherein the slidable tip assembly is constructed to perform its function as described in U.S. Pat. No. 4,480,854 without a clatter or rattle occurring in the relative movement between the tongue plate and the snubber slide slidably engaged therewith.

BRIEF DESCRIPTION OF THE DRAWING

These and other objects and advantages of the invention will become apparent from the following detailed description taken in connection with the accompanying drawings in which:

FIG. 4 is a plan sectional view of the tip assembly of FIG. 1 partially broken away as taken along the line 4—4 of 3;

FIG. 5 is an enlarged view partially in section of the tip assembly of FIG. 1 and the seat belt apparatus of FIG. 6 with apparatus shown in its buckled condition; and FIG. 6 is a schematic illustration of seat belt apparatus showing the belt with the tip assembly of the invention thereon.

DETAILED DESCRIPTION OF THE INVENTION

Figure 1:
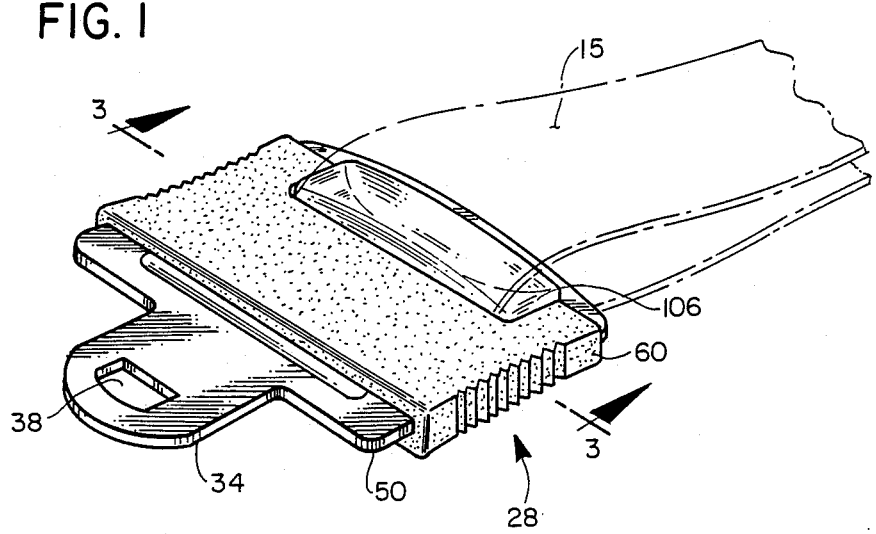
FIG. 1 is a perspective view of a tip assembly in accordance with the invention, a seat belt being illustrated in phantom.

Referring first to FIG. 6, the invention is embodied in a seat belt apparatus 12 mounted in a vehicle 17 having a seat-10 upon which an occupant or passenger will sit. A seat belt 15 is connected at one end to a seat belt retractor 26 which is located outboard of the vehicle seat adjacent a vehicle door 19. The retractor 26 is mounted on the floor of the vehicle 17 as shown in FIG. 6, but in some installations the retractor may be mounted at the vehicle roof rail in the general location where a turning loop 22 is located in the illustrated configuration. The seat belt 15 has a vertical run 24 between the retractor and the turning loop over which the belt freely slides as the occupant grasps a tip assembly 28 on the belt and pulls the belt from the retractor to connect the tip assembly 28 to a seat belt buckle 30. The belt portion extending between the turning loop 22 and a floor anchor 20 is divided into a lap portion 42 and a shoulder portion 44 by the tip assembly 28, as will be explained in greater detail.

In normal use of the illustrated seat belt apparatus 12, the occupant grasps the tip assembly 28 generally laterally across the occupant's body and causes the belt 15 to be extended by drawing it off the retractor 26 and across the occupant's body until sufficient belt has been withdrawn from the retractor to allow the tip assembly to be engaged with the buckle 30. As best seen in FIG. 5, the buckle 30 typically has a receiving opening 32 into which a tongue 34 formed on the tip assembly 28 is inserted, and a locking pawl 36 that is spring biased to a locking condition and is adapted to ride over the tongue 34 and to snap into a locking opening 38 in the tongue 34 to thereby latch the tip assembly to the buckle. A release button 40 typically further is associated with the buckle to disengage the locking pawl 36 from the tongue opening 3 to release the tip assembly from the confined securement with the buckle 30.

In the buckled condition, the lap-engaging span or portion 42 of the belt 15 is defined between the tip assembly 28 and the floor anchor or securing bracket 20. The shoulder-engaging span or portion 44 of the belt is defined between the tip assembly 28 and the turning loop 22.

In the preferred use of the seat belt apparatus illustrated herein, it is desirable to allow for the tight securement of the lap-engaging portion 42 across the lap of the occupant, while yet allowing some looseness in the shoulder-engaging portion 44, thereby allowing the occupant some slight freedom of upper body movement. The looseness in the shoulder-engaging portion 44 should not be allowed to work its way through the tip assembly 28 and ultimately allow the lap-engaging portion 42 to become loose. This is undesirable because if the vehicle were to suddenly stop, it is possible that the occupant could then submarine under the lap-engaging portion 42 of the belt and be injured.

In accordance with this invention, the tip assembly 28 is mounted on the belt 15 so as to be automatically shifted from a free-sliding position in which the tip assembly is freely slidable on the belt when the belt is vertically disposed to a gripping position to grip the belt when the tip assembly is latched to the buckle 30 as shown in FIGS. 5 and 6. In the gripping position, tension of the belt 15 causes a snubbing means on the tip assembly 28 to shift upwardly and rearwardly, i.e., upwardly and to the right as seen in FIG. 5, to bring a wall 70 on a snubber slide 60 and a wall 58 of a tongue plate 50 to pinch or grip the belt in a nip therebetween, as shown in FIG. 5. The belt 15 passes through a slot 52 in the tongue plate 50 and an opening 63 in the snubber slide 60. The tip assembly 28 may freely slide up or down the belt 15 between the turning loop 22 and a stop 31 carried on the belt 15 (FIG. 6) to stop the tip assembly at the height of the stop.

In accordance with an important and further feature of the invention, the tip assembly 28 is formed inexpensively primarily with only the tongue plate 50 and the snubber side 60 as its operating parts. Although the tongue plate 50 could be formed as a sinqle piece out of stamped rigid material, such as steel, the tongue plate in the preferred embodiment includes a rigid frame body 101 and a molded plastic anti-wear liner 100 (FIG. 4) which is joined to the body by a snap fit. The detail of this molded liner 100 is disclosed in U.S. Pat. No. 4,4480,854 in respect of FIG. 7 thereof. This molded liner is formed of material, e.g., plastic, especially formed to provide smooth, sliding surfaces that relieve friction and wear as the belt webbing slides thereagainst.

Alternatively, a liner 100 could be molded onto the frame body 101 as an integral unit.

Figure 3:
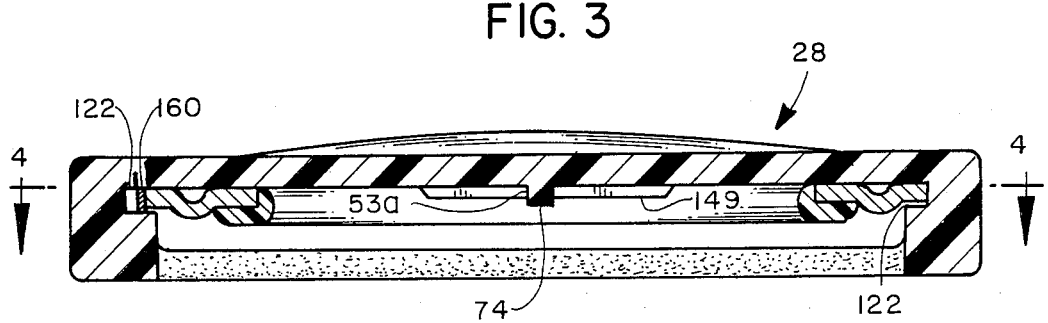
FIG. 3 is a cross-section of the tip assembly as taken along the line 3—3 of FIG. 1.

After the liner 100 is snapped fitted onto the body 101, the tip assembly 28 is completed merely by sliding the snubber slide 60 across the tongue plate beginning at the front tip of the tongue 34 until a detent means 74 (FIGS. 3 and 5) on the interior of the snubber slide 60, which is deflected during assembly, snaps into a channel 53a in the tongue plate 50 and is positioned for locking engagement with the tongue plate 50.

Referring now to a more detailed description of this invention, the tip assembly 28 includes the elongated, generally planar tongue plate 50 which includes the frame body 101 which has a narrowed tongue 34 at its forward end having the locking opening 38 and further which has the opening 52, the belt receiving slot. A pair of stamped ribs 101a flank the lateral sides of the opening 52 and a pair of stamped ribs 101b, one each along the rear of the slot and one along the front of the slot, give the frame 101 additional strength. The channel 53a is cut out in the tongue plate 50 and extends forwardly from the main rectangular portion of the opening 52 toward the tongue 34. The detent 74 slides in the channel 53a and its forward end abuts a stopping surface 53b at the front end of the channel to hold the snubber slide 60 against sliding forwardly off the tongue plate 50.

Figure 2:
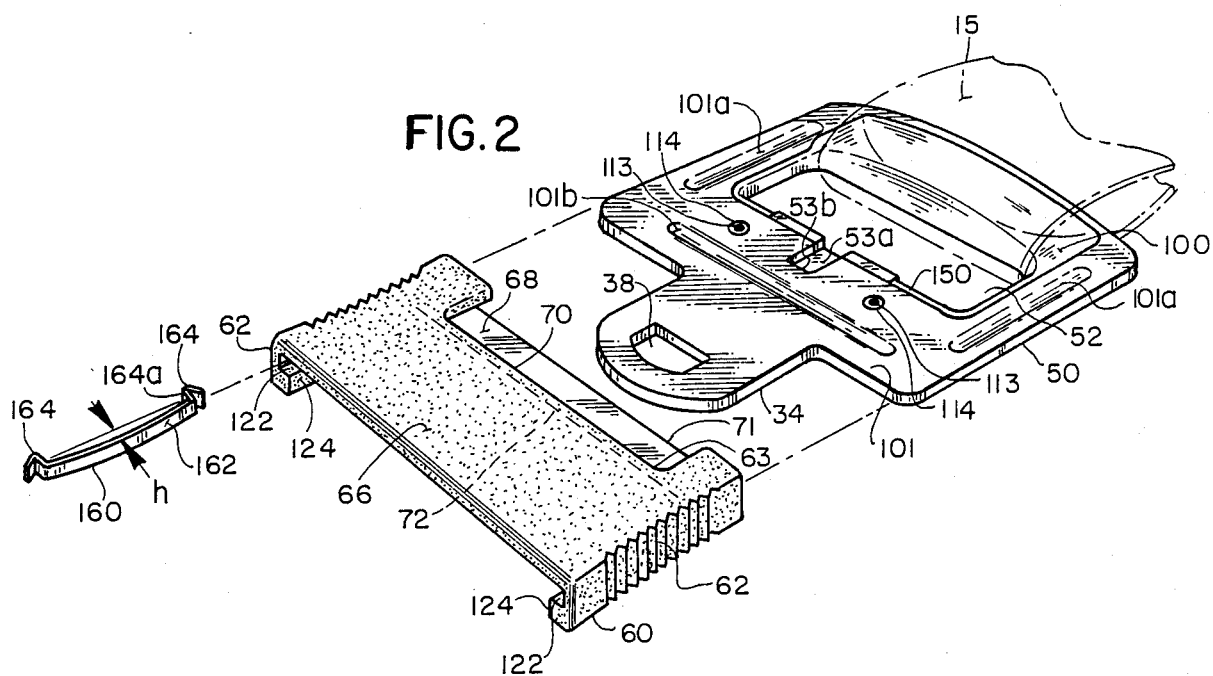
FIG. 2 is a perspective view of the components of a tip assembly of FIG. 1 shown in exploded form.

The snubber slide 60 is adapted to be fitted over the tongue plate 50 prior to the belt being inserted through the slot 52. The snubber slide 60, as best seen in FIG. 2, is a closed, channel-shaped body having the longitudinally extending slot 63 defined by four side walls, namely, a top wall 66 and a bottom wall 68 joined to a pair of short side walls 62 at corner sections. The top wall 66 and the bottom wall 68 are generally flat, planar and parallel. The top wall 66, the side wall 62 and opposed elongated flanges 124 of the bottom wall that extend forward of the rest of the bottom wall, provide channel-shaped regions 122 at the sides of the snubber slide 60 which receive the lateral edges of the tongue plate 50, specifically the lateral edges of the rigid frame body 101 of the tongue plate, in a sliding engagement.

To lock the snubber slide 60 onto the tongue plate 50, the detent 74 projects downwardly and inwardly from the wall 66 and is adapted to be snap fitted into the frame slot 52 when the snubber slide 60 is positioned in place over the tongue plate 50. The detent 74 restricts the forward sliding movement of the snubber slide 60 on the tongue plate 50 to prevent disassembly thereof. The preferred detent 74 is an integrally molded narrow protrusion that depends from the center of the upper wall 66 through the slot 52 and into the channel 53a when the snubber slide 60 is in its forward position. The detent 74 is elongated in the sliding direction and has a front surface 148 that serves as a stop against forward-disengaging motion. The stop surface 148 extends through the frame perpendicular to the sliding direction substantially to the level of the lower surface of the frame of the rigid frame body 101 and engages the front surface 53b of the channel 53a that is likewise perpendicular to the sliding direction. To assure sufficient locking engagement, the stop surface 148 should extend into the channel 53a to at least about one half of the distance to the underside of the frame body 101 and preferably the full distance through, as illustrated. The stop surface 148 should be at least perpendicular but may angle forward from the upper wall 66, in which instance the front channel surface 53bshould have a complementary angle. A cross protrusion 149 (FIG. 3) depending from the rear edge of the upper wall 66 just behind the detent 74 engages the forward edge 150 of the slot 52, assisting the detent in stopping forward sliding of the snubber slide 60.

In a preferred form of the illustrated tip assembly 28, the rigid frame body 101 is formed of a durable structural material, such as steel, and the snubber slide 60 and the anti-wear liner 100 are both formed of a durable plastic material. The use of plastic for the slide 60 has been intended for the elimination of metal-to-metal rattling between pieces of the tip assembly.

It has been found, however, that another form of clatter or rattle may occur between the parts of the steel and the plastic, the plastic being a relatively hard surfaced body. It is desirable to remove this clatter or rattle between these parts while yet providing the advantageous features of the invention disclosed and claimed in U.S. Pat. No. 4,480,854.

Several means of removing this clatter or rattle have been considered. One advantageous means in particular has been found successful and is illustrated herein. Such includes locating dampening means between at least a part of the portions of the tongue plate 50 and the snubber slide 60 that engage one another. A specific dampening means in the form of spring means is illustrated in FIGS. 2 and 4 wherein there is shown a single leaf spring 160. The spring is formed so that a main body portion 162 is bow-shaped with a maximum height (h) from the flat occurring at its center region. At either end of the main body 162 is a return-bend portion 164, a first part 164a of which extends approximately at right angles to the main body portion 162. The two return-bend portions 164 extend in the same direction such that the surfaces of the first parts 164a of each are slightly canted inwardly toward one another in a shoulder-gripping manner as best seen in FIG. 4. In this manner, the spring may be easily assembled and retained in the channel-shaped region 122. To accommodate the spring with its shoulder-gripping return-bend portions, at least one of the two lateral channel-shaped regions 122 of the snubber slide 60 has notches 166 at either end formed therein generally conforming to the size and shape of the return-bend portions 164 of the single leaf spring 160.

The spring 160 preferably is made of a spring steel so that any deformation from its original shape will create a bias tending to return the spring to its original shape. Thus, when the spring has a bow-shape with a given height (h) in its free state and is placed in position and retained in the notches 166 of a channel-shaped region 122, the basic height (h) will be maintained. Upon assembly of the snubber slide 60 with the spring 160 mounted therein onto the tongue plate 50, the spring will be deformed as its outer surface rides along one of the lateral edges 168 of the tongue plate 50. The height (h) is determined to be slightly greater than the available space in the channel-shaped region 122 when the snubber slide is pressed against the opposite lateral edge 168 of the tongue plate. This would be, for example, in a direction opposing the direction of an arrow 170 there shown. In such instance, when the height (h) is greater than the clearance made available in the opposing channel-shaped region 122, the spring 160 will deform by its outer surface being slightly compressed by the adjacent lateral edge 168 of the tongue plate. Because the spring is resilient, it tends to expand to its original shape and is limited only by the clearances between the two parts. The result is that the snubber slide 60 is biased to the side containing the spring, almost eliminating the clearance between the parts at the point of the arrow 170. Because the excess space between the two parts has been substantially eliminated by the biasing of the spring 160, a quiet condition exists between the two parts without sacrificing the sliding movement of the snubber slide 60 along the lateral edges of the tongue plate 50. Of course, it is possible in such a structure for the spring to have such bias as to impair the relative movement between the two parts, particularly to the extent that the weight of the steel tongue plate is not sufficient to overcome resulting friction and pull the belt down after the tip has been disconnected from the buckle and the belt has returned to a generally vertical alignment. In such instance, as has been mentioned previously, the tip assembly 28 is to be free-falling, at least down to the stop 31. If friction is excessive, such free-falling would not occur. Thus, the urging of the spring needs to be sufficient to reduce excessive movement, especially lateral movement, between the snubber slide 60 and the tongue plate 50 without applying excessive friction so as to impede a freely sliding movement therebetween. The snubber slide should be able to slide along the tongue plate in response to normal forces being applied to it when the belt run assumes a substantially vertical position so that the belt gripping position of the snubber slide, after having been obtained when the tip assembly was buckled, is released. This released condition should then allow free-falling of the tip assembly 28.

To assemble the tip assembly 28, the spring 160 is first placed in position in the channel-shaped region 122 at one of the lateral edges of the snubber slide 60 so that the spring is secured by the return bends at either end thereof gripping the side edges of the notches 166. Next, if the tongue plate 50 is made up of two separate parts, vis-a-vis being a unitary molded part, i.e., the rigid frame body 101 and a molded liner 100, the molded liner 100 must be joined to the rigid frame body by a snap-on action. A pair of hollow cylindrical projections 113 (FIG. 2) extend through a pair of holes 114 in the rigid frame body 101 flanking the channel 53a. This along with various lips and a channel portion, as completely described in U.S. Pat. No. 4,480,854, contribute to the locking snap fit of the liner 100 on the rigid frame body 101 to complete the tongue plate 50. The tongue plate 50 and the snubber slide 60 are then telescoped relative to one another and brought to the position where the detent 74 snaps into the channel 53a. A beveled surface 152 at the rear of the detent 74 facilitates the sliding of the snubber slide 60 onto the tongue plate by camming over the front end of the tongue 34 and then over the rear edge of the locking opening 38, which action deforms the upper wall 66 so that the snubber slide can be slid rearwardly to where the detent 74 snaps into position.

The bottom wall 68 of the snubber slide 60 is very short and almost bar-shaped between its transverse forward edge 72, which abuts the belt when the tip assembly is buckled as seen in FIG. 5, and a rear transverse edge 71. The forward transverse edge 72 of the bottom wall 68 is located only slightly forward of the upper rear edge 70 of the top wall 66, as clearly shown in FIG. 5. The bottom wall 68 is free to slide underneath the rear portion of the frame liner 100 when the tip is buckled.

When the tip assembly 28 has been assembled with the belt 15 fed therethrough, the belt passes through the frame slot 52 of the tongue plate 50 and also through the slot 63 in the snubber slide 60. The normal weight imbalance caused by the tongue 34 will cant the tip assembly 28 relative to the vertical position of the belt 15. The snubber slide 60 will have moved forwardly along the tongue plate 50 from the belt-gripping position of FIG. 5, and that movement will allow the tip assembly to slide freely along the front and rear surfaces 80 and 81 of the belt (as seen in FIG. 6). The unbuckled tip assembly 28 is thereby free to slide downwardly along the vertical position of the belt until striking the stop 31.

To engage the tip assembly 28 operatively with the buckle 30, the occupant merely grasps the tip assembly 28 and moves it in a lateral direction across the occupant's body and slides the tip assembly along the belt until the tongue 34 is brought to latch with the buckle 30, feeding out during this effort sufficient belt webbing to define the lap-engaging span 42 and the shoulder-engaging span 44 (FIG. 6). During this buckling action the extending belt is being pulled through the turning loop 22 and initially into the shoulder-engaging span 44 while the tip assembly 28 slides freely along the belt. When the tip assembly 28 is engaged with the buckle 30, the pull of the retractor 26 exerts an upward and rightward force on the tip assembly, as viewed in FIG. 6, shifting the snubber slide 60 in this same direction to the belt-gripping position as seen in FIG. 5. In this position, the belt shoulder portion 44 trained about the forward edge 72 of the snubber slide 60 draws the snubber slide upwardly along the tongue plate 50 until the upper grip edge 70 of the snubber slide 60 and the facing grip edge 58 on the frame liner 100 tightly squeeze the inter-positioned belt 15 (FIG. 5). In this position, the tightly pinched belt 15 precludes any further withdrawal of the belt webbing in the direction toward the lap-engaging portion 42 which would tend to enlarge the lap-engaging portion. On the other hand, tension from the shoulder-engaging portion 44 allows the lap-engaging portion to be made tighter. At the same time, looseness of the shoulder-engaging portion 44 is permitted without looseness of the belt slipping toward the lap-engaging portion 42. The thickness of the rear portion 106 of the liner 100 (FIG. 6) is such that it projects upwardly to the level of the top surface of the upper wall 66 of the snubber slide 60, and, hence, this rear portion 106 and the belt 15 limit the rearward movement of the snubber slide 60 on the tongue plate 50 (FIG. 1).

Although a preferred embodiment has been shown and described, it should be understood that there is no intent to limit the invention by such disclosure. Rather, the intention is to cover all modifications and alternative constructions that fall within the spirit and scope of the invention.

Various features of the invention are set forth in the appended claims.

What is claimed is:

1. A tip assembly for free sliding mounting on a safety belt, the tip assembly comprising:
    a tongue plate for connection to a buckle, the tongue plate having lateral edges,
    snubber slide means movable in a forward and rearward direction and slidably engaged with the tongue plate for gripping the belt,
    channel-shaped region walls at the lateral edges of the snubber slide means receiving the lateral edges of the tongue plate,
    the snubber slide means being slidable on the tongue plate to a belt gripping position when the tip assembly is mounted on a belt that is under tension and the tongue plate is connected to a buckle,
    the snubber slide means being slidable to a position that will allow sliding of the tip assembly downwardly along the belt when the belt is in a vertical position and the tongue plate is disconnected from the buckle, and
    said tongue plate being a substantially flat plate having top and bottom sidewalls,
    said snubber slide means having portions covering the top and bottom sidewalls and the lateral edges of the flat plate,
    the snubber slide means having an opening through which the belt passes, and
    dampening means including a spring located between at least part of the portions of the tongue plate and the snubber slide means that engage one another to urge the lateral edges of the flat plate in a lateral direction against the channel-shaped region walls to reduce noise between the tongue plate and the snubber slide means.

2. A tip assembly in accordance with claim 1, including the dampening means spring being bow-shaped and being located in at least one of the channel-shaped regions of the snubber slide means adjacent a corresponding lateral edge of the tongue plate.

3. A tip assembly in accordance with claim 2, wherein said spring is a single leaf spring having the general form of a bow-shaped curve.

4. A tip assembly in accordance with claim 3, wherein the spring is made of steel.

5. A tip assembly for free sliding mounting on a safety belt, the tip assembly comprising:
    a tongue plate for connection to a buckle, the tongue plate having lateral edges,
    snubber slide means slidably engaged with the tongue plate for gripping the belt,
    the snubber slide means being slidable on the tongue plate to a belt gripping position when the tip assembly is mounted on a belt that is under tension and the tongue plate is connected to the buckle,
    the snubber slide means being slidable to a position that will allow sliding of the tip assembly downwardly along the belt when the belt is in a vertical position and the tongue plate is disconnected from the buckle, and
    the snubber slide means having an opening through which the belt passes, and dampening means located between at least part of the portions of the tongue plate and the snubber slide means that engage one another channel-shaped regions at the lateral edges of the snubber slide means receiving the lateral edges of the tongue plate, the dampening means being located in at least one of the channel-shaped regions of the snubber slide means adjacent a corresponding lateral edge of the tongue plate, the dampening means being a spring means, the spring means being a single leaf spring having the general form of a bow-shaped curve, at least one of the channel-shaped regions of the snubber slide means including a notch formed therein at each end of the channel and the spring means including a bent portion at either end thereof for gripping in the notches to retain the spring in location when the snubber slide means is assembled on the tongue plate, the bow-shaped curve portion of the spring thereby being in sliding contact with the corresponding lateral edge of the tongue plate.

* * * * *